United States Patent [19]
Buckman et al.

[11] 4,018,592
[45] Apr. 19, 1977

[54] METHOD OF CONTROLLING THE GROWTH OF ALGAE

[75] Inventors: Stanley J. Buckman; Gerald D. Mercer, both of Memphis, Tenn.

[73] Assignee: Buckman Laboratories, Inc., Memphis, Tenn.

[22] Filed: July 21, 1975

[21] Appl. No.: 597,602

[52] U.S. Cl. .................................................. 71/67
[51] Int. Cl.$^2$ ........................................ A01N 9/20
[58] Field of Search ....................................... 71/67

[56] References Cited

UNITED STATES PATENTS

| | | | |
|---|---|---|---|
| 3,771,989 | 11/1973 | Pera et al. | 71/67 |
| 3,943,255 | 3/1976 | Newkirk | 71/67 X |

*Primary Examiner*—Lewis Gotts
*Assistant Examiner*—Catherine L. Mills
*Attorney, Agent, or Firm*—Floyd Trimble

[57] ABSTRACT

Poly[2-hydroxyethylene(dimethyliminio)ethylene(dimethyliminio)methylene dichloride] prepared by the reaction of N, N, N', N'-tetramethylethylenediamine with hydrochloric acid and epichlorohydrin is useful as an algicide.

5 Claims, No Drawings

METHOD OF CONTROLLING THE GROWTH OF ALGAE

This invention relates to the method of preparation and use of the product poly [2-hydroxyethylene(dimethyliminio)ethylene(dimethyliminio)methylene dichloride] in controlling the growth of algae. More particularly, the foregoing polymer is useful as an algicide in industrial aqueous systems and swimming pools wherein said algicide should be nonfoaming or substantially so and, in addition, must be nontoxic and nonirritating to warm-blooded animals. As used herein, the term, "warm-blooded animals", is used in its broad sense to include man, lower animals and fowls.

As is well-known to those skilled in the art, almost ideal conditions exist in cooling towers and other industrial systems as defined above, favorable to the growth of algae. Obviously, if means are not taken to inhibit the growth of algae therein the operating efficiency of such systems will be greatly reduced. In other systems such as in swimming pools, as one example, the growth of algae therein is objectionable, not only for aesthetic reasons, but in addition thereto, if allowed to persist the result is an unsanitary condition.

It has been suggested in the chemical literature that many compositions, including certain quaternary ammonium compounds, could be used as algicides. These compounds, while more or less effective as algicides, are not entirely satisfactory. Specifically, the quaternary ammonium compounds are cationic surfactants and when added to water even in minute quantities, produce a system tending to foam, an objectionable result in most applications. Another objection to the use of quaternary ammnonium compounds resides in the fact that their preparation is rather complicated and difficult. Furthermore, these quaternary compounds are generally irritating to the skin of warm-blooded animals. It is, therefore, a principal object of the present invention to provide a process for the control of algae which process obviates the disadvantages of the prior art processes of this type.

It is another object of our invention to provide an algicide that can be prepared by an economical and rather simple process.

These and other objects, features, and advantages of the invention will become apparent as the description proceeds.

To the accomplishment of the foregoing and related ends, this invention then comprises the features hereinafter fully described and pointed out in the claims, the following description setting forth in detail certain illustrative embodiments of the invention, these being indicative, however, of but a few of the ways in which the principles of the invention may be employed.

In brief, the foregoing objects and advantages are attained by employing as an algicide a highly-water-soluble cationic polymeric polyelectrolyte prepared by reacting epichlorohydrin and hydrochloric acid with N,N,N',N'-tetramethylethylenediamine in an aqueous medium. Generally the polymers prepared by this reaction have molecular weights varying from about 800 to about 10,000. They may be further characterized by formula and name as approved by the editors of Chemical Abstracts as follows:

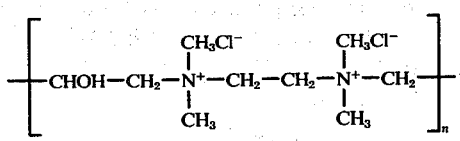

Poly [2-hydroxyethylene(dimethyliminio)ethylene(dimethyliminio)methylene dichloride] Wherein $n$ is an integer varying from 4 to 40.

When these polymers are used as algicides according to the teachings of our invention, suitable quantities vary from 0.1 to 100 parts per million parts of water. Preferred quantities vary from 0.2 to 20 parts per million parts of water. It will be understood, of course, that larger quantities of the polymer may be used with no detrimental effect, but such larger quantities increase the cost of operation with limited material benefit.

Since the polymeric polyelectrolytes as disclosed herein are not only very effective algicides but, in addition thereto, are substantially nonfoaming and nonirritating, they are particularly useful in such diverse applications as the control of algae in cooling towers, holding ponds, swimming pools and similar applications were an algicide having such properties is mandatory, or at least desirable.

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

Preparation of poly[2-hydroxyethylene(dimethyliminio)ethylene(dimethyliminio)methylene dichloride]

A 12 liter flask equipped with a mechanical agitator, condenser, thermometer and dropping funnel was charged with 965 grams of 60 percent N,N,N',N'-tetramethylethylenediamine. The solution was cooled with an icewater bath and 975 grams of 37.5 percent hydrochloric acid was added dropwise over a period of 1.5 hours at a temperature below 45° C. To the N,N,N',N'-tetramethylethylenediamine dihydrochloride solution was added 925 grams of epichlorohydrin at 20° to 35° C. over a period of 3 hours. The reaction mixture was agitated at room temperature until a homogeneous solution was obtained — approximately 3 hours. To this solution was added 965 grams of 60 percent N,N,N',N'-tetramethylethylenediamine at such a rate that the reaction temperature did not exceed 70° C. The solution temperature was maintained at 70°C. for 0.5 hour and then heated to reflux and maintained for 1 hour. The resulting product exhibited a viscosity of 720 centipoises. The polymer so prepared had a molecular weight of about 3,000.

Additional poly [2-hydroxyethylene(dimethyliminio)ethylene(dimethyliminio)-methylene dichloride] were prepared having molecular weights varying from about 800 to about 10,000 by varying the experimental conditions used in Example 1.

In Example 2, the effectiveness of the polymer of Example 1, hereinafter designated Compound A, against various algae was determined. For comparison purposes, the effectiveness of the polymer poly[oxyethylene(dimethyliminio)ethylene(dimethyliminio)ethylene dichloride] disclosed and claimed in U.S. Pat. No. 3,771,989, hereinafter designated Compound B, was determined at the same time under identical conditions.

EXAMPLE 2

The effectiveness of Compounds A and B against the three algae; *Chlorella pyrenoidosa*, *Chlorococcum hypnosporum* and *Phormidium inundatum*.

Using the procedure described in Example 2 of U.S. Pat. No. 3,771,989, growth observations were made on the basis of the following key:

4 = Excellent
3 = Good
2 = Poor
1 = Very poor, scant, questionable
0 = No growth The results are summarized in Table 1.

TABLE 1

Inhibition of *Chlorella pyrenoidosa*, *Chlorococcum hypnosporum*, and *Phormidium inundatum* by the compounds A and B in Difco Algae Broth after 21 days incubation.

| Test organism | Concentration | Compounds tested | |
|---|---|---|---|
| | | Compound A | Compound B |
| | Parts per million | | |
| *Chlorella pyrenoidosa* | 0.1 | 4 | 4 |
| | 0.3 | 4 | 4 |
| | 0.5 | 4 | 4 |
| | 1.0 | 4 | 0 |
| | 2.0 | 0 | 0 |
| | 4.0 | 0 | 0 |
| | 8.0 | 0 | 0 |
| *Chlorococcum hypnosporum* | 0.1 | 2 | 2 |
| | 0.3 | 2 | 0 |
| | 0.5 | 0 | 0 |
| | 1.0 | 0 | 0 |
| | 2.0 | 0 | 0 |
| | 4.0 | 0 | 0 |
| | 8.0 | 0 | 0 |
| *Phormidium inundatum* | 0.1 | 4 | 4 |
| | 0.3 | 4 | 4 |
| | 0.5 | 4 | 4 |
| | 1.0 | 4 | 4 |
| | 2.0 | 4 | 4 |
| | 4.0 | 4 | 4 |
| | 8.0 | 0 | 0 |

EXAMPLE 3

In this example, a patch test was conducted to determine if the polymer of Example 1 was an irritant to human skin. Two drops of a 64 percent aqueous solution of the polymer was applied to a small area on the forearm of 19 male and 11 female adults. The treated area was covered for a period of 24 hours with a 1-inch Band-Aid. None of the adults involved in the test showed any indication of skin irritation immediately after removal of the Band-Aid or anytime thereafter.

EXAMPLE 4.

In this experiment, the amount of foam produced by a solution containing 100 p.p.m. of the polymer of Example 1, designated solution No. 1, and that by a solution containing 100 p.p.m., based on the active component of an algicide available commercially under the trademark, Hyamine 3500, hereinafter designated solution No. 2, were measured. The product Hymaine 3500 consists of two components; 50% inert ingredients and 50% of the active component n-alkyl (10% $C_{10}$, 40% $C_{12}$ and 50% $C_{14}$) dimethylbenzylammonium chloride. All percentages are by weight.

One hundred milliliters of each solution was agitated for a period of 15 seconds on a shaker, after which the foam height was measured.

The experiments, together with the results, are summarized in Table 2.

TABLE 2

Cooperative foam-producing characteristics of the two algicides.

| Solution | Foam height |
|---|---|
| | millimeters |
| 1 | 0 |
| 2 | 35 |

While particular embodiments of the invention have been described, it will be understood, of course, that the invention is not limited thereto since many modifications may be made and it is, therefore, contemplated to cover by the appended claims any such modifications as fall within the true spirit and scope of the invention.

The invention having thus been described, what is claimed and desired to be secured by Letters Patent is:

1. A method of inhibiting the growth of algae in an aqueous system which comprises contacting said algae with a polymer having the formula and name:

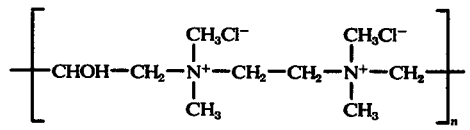

(Poly [2-hydroxyethylene(dimethyliminio)ethylene(dimethyliminio)methylene dichloride])-prepared by reacting epichlorohydrin and hydrochloric acid with N,N,N',N'- tetramethylethylenediamine in an aqueous medium wherein $n$ is an integer varying from 4 to 40 in an amount sufficient to inhibit the growth of said algae.

2. The method of claim 1 wherein the polymer has a molecular weight varying from 800 to 10,000.

3. The method of inhibiting the growth of algae in cooling towers which comprises adding to the water in said cooling tower the polymer defined in claim 1 in an amount sufficient to inhibit the growth of said algae.

4. The method of inhibiting the growth of algae in holding ponds which comprises adding to the water in said holding ponds the polymer defined in claim 1 in an amount sufficient to inhibit the growth of said algae.

5. The method of inhibiting the growth of algae in swimming pools which comprises adding to the water in said swimming pools the polymer defined in claim 1 in an amount sufficient to inhibit the growth of said algae.

* * * * *